(12) United States Patent
Kano et al.

(10) Patent No.: US 8,060,837 B2
(45) Date of Patent: Nov. 15, 2011

(54) INFORMATION PROCESSING DEVICE AND PROGRAM

(75) Inventors: Izua Kano, Tokyo (JP); Eiju Yamada, Tokyo (JP); Keiichi Murakami, Tokyo (JP); Yasushi Onda, Tokyo (JP); Kazuhiro Yamada, Tokyo (JP); Dai Kamiya, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 507 days.

(21) Appl. No.: 12/178,881

(22) Filed: Jul. 24, 2008

(65) Prior Publication Data

US 2009/0031248 A1 Jan. 29, 2009

(30) Foreign Application Priority Data

Jul. 24, 2007 (JP) .................................. 2007-192407

(51) Int. Cl.
*G06F 3/048* (2006.01)
(52) U.S. Cl. ......... 715/790; 715/798; 715/799; 715/780
(58) Field of Classification Search ................... 715/788, 715/790, 792, 798–800
See application file for complete search history.

(56) References Cited

U.S. PATENT DOCUMENTS

| | | | | |
|---|---|---|---|---|
| 5,060,170 A | * | 10/1991 | Bourgeois et al. | 715/788 |
| 5,487,143 A | * | 1/1996 | Southgate | 715/790 |
| 6,008,809 A | * | 12/1999 | Brooks | 715/792 |
| 7,546,547 B2 | * | 6/2009 | Carey et al. | 715/788 |
| 7,844,917 B2 | * | 11/2010 | Rigolet | 715/798 |
| 2005/0125742 A1 | * | 6/2005 | Grotjohn et al. | 715/799 |
| 2006/0150117 A1 | * | 7/2006 | Fujita | 715/788 |

FOREIGN PATENT DOCUMENTS

| | | |
|---|---|---|
| CN | 1739096 | 2/2006 |
| JP | 09185356 | 7/1997 |
| JP | 2004-094423 | 3/2004 |
| JP | 2004094423 | 3/2004 |

OTHER PUBLICATIONS

Chinese Office Action Dated February 5, 2010; Chinese Application No. 2008101340838.
Chinese Office Action for Chinese Application No. 2008101340838, dated Jul. 13, 2010.
English translation for Chinese Office Action for Chinese Application No. 2008101340838, dated Jul. 13, 2010.

* cited by examiner

*Primary Examiner* — William L Bashore
*Assistant Examiner* — Andrew Tank
(74) *Attorney, Agent, or Firm* — Michaud-Kinney Group LLP

(57) ABSTRACT

An information processing device includes: a receiving unit configured to receive an instruction input by a user; a display control unit configured to control a display unit to display a plurality of windows in a display area of the display unit; and a window control unit configured to control a size or position of a window displayed on the display unit in response to the instruction received, the window control unit being configured to control, if the receiving unit receives an instruction to expand a first window and the expanded first window overlaps a second window, a size or position of the second window in response to a positional relationship between the first window and the second window.

5 Claims, 8 Drawing Sheets

FIG. 3
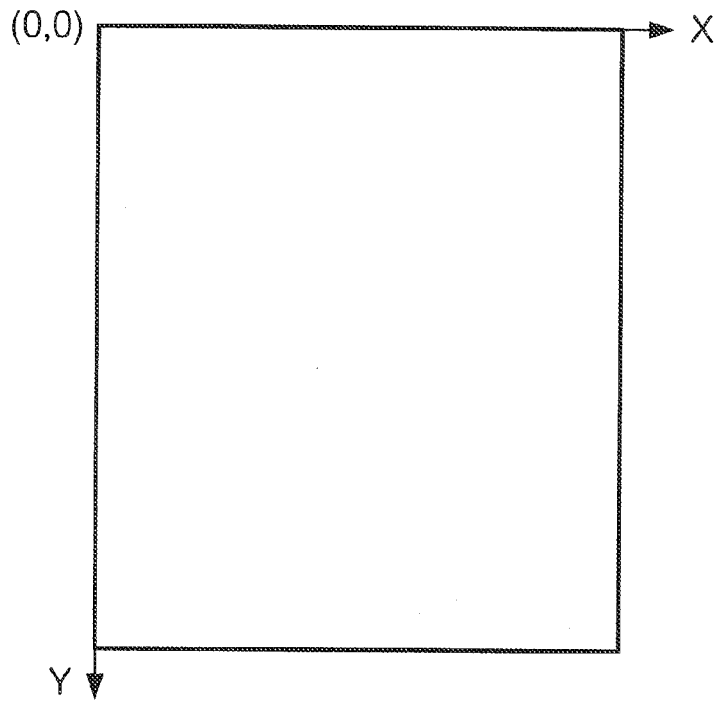
FIG. 4
| WINDOW IDENTIFIER | COORDINATES OF VERTEXES |
|---|---|
| 001 | (X1,Y1)(X1,Y2)(X2,Y1)(X2,Y2) |
| 002 | (X3,Y3)(X3,Y4)(X4,Y3)(X4,Y4) |
FIG. 5
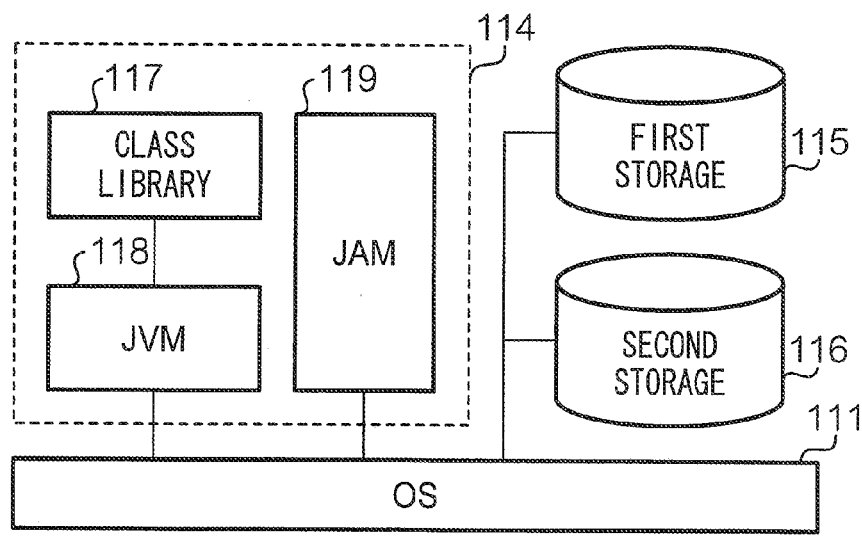

INFORMATION PROCESSING DEVICE AND PROGRAM

TECHNICAL FIELD

The present invention relates to graphical user interface in a computer device.

BACKGROUND

Some computer devices, which execute an application program on an operating system, execute plural application programs in parallel and display plural windows, each of which corresponds to an application program, as user interface. For example, JP-A-2004-94423 discloses a method for controlling plural windows.

According to a system in JP-A-2004-94423, under a condition that a first window and a second window are displayed, if a user expands the first window and a border of the first window touches the second window, the second window is moved so as to not overlap the first window. If the second window cannot be moved so as to not overlap the first window, the size of the second window is shrunk with an increase in size of the first window. In this way window overlap is prevented, and a user is able to view plural windows simultaneously.

SUMMARY

In a system disclosed in JP-A-2004-94423, if a second window can no longer be shrunk, the first window cannot be expanded. In a case that a user wants to further expand the first window, the user can expand the first window in a direction opposite to the previous direction to which the window is expanded if there is enough space in the opposite direction. To change a direction of expansion, a user has to drag an edge or a vertex of a window, which is inconvenient. The present invention provides a solution for expanding a window in such a way that it does not overlap another window, without a user having to perform a specific operation.

According to one aspect of the invention, there is provided an information processing device, including: a receiving unit configured to receive an instruction input by a user; a display control unit configured to control a display unit to display a plurality of windows in a display area of the display unit; and a window control unit configured to control a size or position of a window displayed on the display unit in response to the instruction received, the window control unit being configured to control, if the receiving unit receives an instruction to expand a first window and the expanded first window overlaps a second window, a size or position of the second window in response to a positional relationship between the first window and the second window, wherein if (i) the overlapping is avoided by moving of the second window toward a direction in which the first window expands and (ii) the moved second window is displayed within the display area, the window control unit is configured to move the second window toward a direction in which the first window expands, if (i) the overlapping is avoided by moving of the second window toward a direction in which the first window expands and shrinking a size of the second window, (ii) the moved second window is displayed within the display area, and (iii) the shrunk second window is larger than a predetermined size, the window control unit is configured to move the second window toward a direction in which the first window expands and shrink the second window, if (i) the overlapping is avoided by moving of the second window toward a direction in which the first window expands and shrinking a size of the second window, (ii) the moved second window is displayed within the display area, and (iii) the shrunk second window is smaller than the predetermined size, the window control unit is configured to move the second window to a position where the second window does not overlap the expanded first window.

It is preferable that if the overlapping is avoided by moving of the second window toward a direction in which the first window expands and shrinking a size of the second window, the moved second window is displayed within the display area, and the shrunk second window is smaller than the predetermined size, the window control unit is configured to move the second window to a predetermined position within the display area.

It is preferable that if the overlapping is avoided by moving of the second window toward a direction in which the first window expands and shrinking a size of the second window, the moved second window is displayed within the display area, and the shrunk second window is smaller than a predetermined size, the window control unit is configured to move the second window toward an opposite direction to that in which the first window expands and shrink the size of the second window.

It is preferable that the information processing device further includes a storage unit configured to store a size of a window for each window displayed on the display unit, wherein the window control unit is configured to control the a storage unit to store a size of the second window, if the overlapping is avoided by moving of the second window toward a direction in which the first window expands and shrinking a size of the second window, the moved second window is displayed within the display area, and the shrunk second window is smaller than a predetermined size, the window control unit is configured to move the second window to a position where the second window does not overlap the expanded first window and controls a size of the second window so as to be the same as the size stored in the a storage unit.

According to another aspect of the invention, there is provided a program causing a computer device to execute a process, the process including: receiving at a receiving unit an instruction input by a user; controlling a display unit to display a plurality of windows in a display area of the display unit; and controlling a size or position of a window displayed on the display unit in response to the instruction received, the control being performed, if the receiving unit receives an instruction to expand a first window and the expanded first window overlaps a second window, a size or position of the second window in response to a positional relationship between the first window and the second window, wherein if the overlapping is avoided by moving of the second window toward a direction in which the first window expands and the moved second window is displayed within the display area, a control is performed to move the second window toward a direction in which the first window expands, if the overlapping is avoided by moving of the second window toward a direction in which the first window expands and shrinking a size of the second window, the moved second window is displayed within the display area, and the shrunk second window is larger than a predetermined size, a control is performed to move the second window toward a direction in which the first window expands and shrink the second window, if the overlapping is avoided by moving of the second window toward a direction in which the first window expands and shrinking a size of the second window, the moved second window is displayed within the display area, and the shrunk second window is smaller than a predetermined size, a control is performed to move the second window to a position where the second window does not overlap the expanded first window.

According to the information processing device or the program, a window is expanded without overlapping other window and specific operation of a user.

BRIEF DESCRIPTION OF THE DRAWINGS

A preferred embodiment of the present invention will now be described in detail with reference to the following figures, wherein:

FIG. 3 shows an example of a coordinate system of a display area;

FIG. 4 shows an example of a window table TB;

FIG. 5 shows an example of Java Runtime Environment implemented in mobile phone 1;

DETAILED DESCRIPTION

1. Configuration

Figure 1:
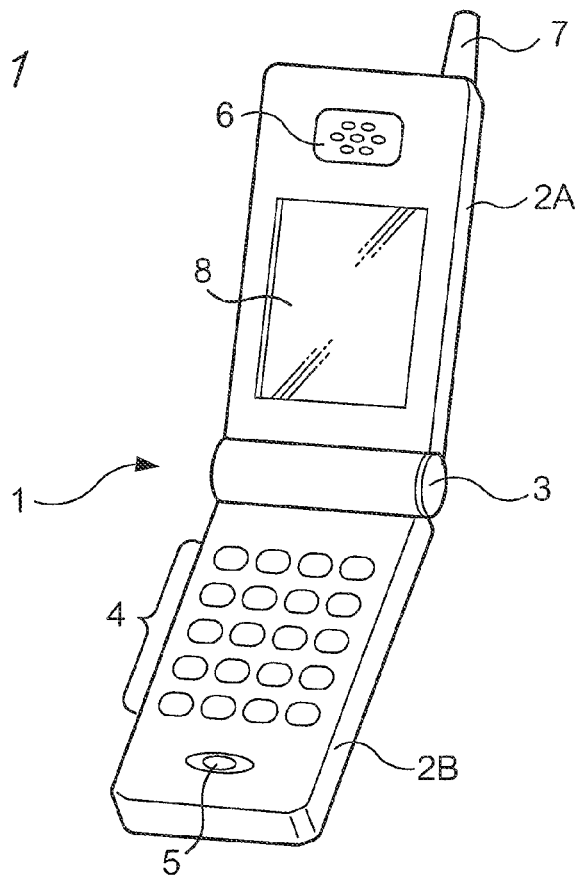
FIG. 1 is a drawing illustrating an exterior view of mobile phone 1 in accordance with one embodiment of the invention.

FIG. 1 is an exterior view drawing of a folding type mobile phone 1, which is an example of an information processing device in accordance with one embodiment of the invention. The mobile phone 1 has a first case 2A and a second case 2B. A hinge 3 connects the first case 2A and the second case 2B to each other. In conducting voice communication or data communication, a user uses the mobile phone 1 with the first case 2A and the second case 2B in an open position.

The second case 2B has a keypad 4 and a microphone 5. A user operates the keypad 4. The microphone is used to input a user's voice into the mobile phone 1. Inside the second case 2B are various electronic parts (not shown in the figure) such as a CPU (Central Processing Unit), a RAM (Random Access Memory), and a non-volatile memory. The CPU controls operation of the mobile phone 1. The RAM is used as a work area for the CPU. The non-volatile memory stores programs executed by the CPU and data used by the program. The first case 2A has a speaker 6, an antenna 7 and a display device 8. The speaker 6 outputs sound or voice for voice communication. The antenna 7 is used for wireless communication with a wireless base station. The display device 8 displays character strings or an image.

Figure 2:
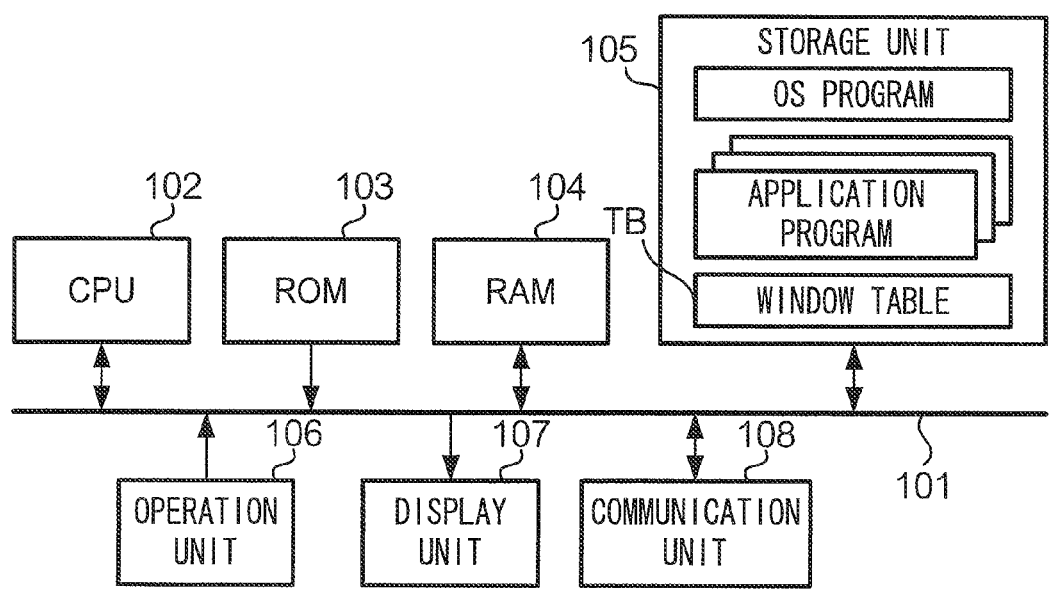
FIG. 2 is a block diagram illustrating a hardware configuration of mobile phone 1.

FIG. 2 is a block diagram illustrating a hardware configuration of the mobile phone 1. A bus 101 mutually connects the hardware elements of the mobile phone. A communication unit 108 has the antenna 7, and performs voice communication or data communication with a wireless base station, which relays data for communication by the mobile phone 1. An operation unit 106 has the keypad 4, which includes, for example, a ten-key pad for inputting a numeric character or letter, keys for instructing initiation of a call, termination of a call, cancellation of an operation, initiation of use of a menu, and turning power on or off. A user inputs to the mobile phone 1 an instruction or data by operating the keypad 4 of the operation unit 106.

A display unit has the display device 8, and displays a cursor, a window relating to an application program, a character, an image, and a menu to operate the mobile phone 1. In the display unit 107, an xy-coordinate system is defined as shown in FIG. 3, whose origin is defined as a left-top point of a display area. Based on the origin (0, 0), the x-axis extends rightward and the y-axis extends downward in FIG. 3.

Referring to FIG. 2 again, a ROM (Read Only Memory) 103 is a memory that stores an IPL (Initial Program Loader), an OS (Operating System) program, and a Java™ platform program to implement a Java runtime environment. A storage unit 105 has a non-volatile memory (not shown in the figures), and stores a program, for example, an application program for a video game. The application program includes a JAR (Java Archive) file, which includes a byte code in Java program language and an ADF (Application Descriptor File), which describes data relating to the JAR file.

In addition, the storage unit 105 stores a window table TB. FIG. 4 shows an example of the window table TB. The window table TB has a "window identifier" field and a "vertex coordinates" field. In the window identifier field, an identifier is recorded for identifying a window displayed on the display unit 107 when the CPU 102 executes an application program. In the vertex coordinates field, vertex coordinates are recorded for indicating a position of vertexes of a window identified by a corresponding window identifier field.

When power for the mobile phone 1 is turned on, the CPU 102 executes the IPL stored in the ROM 103. When executing the IPL, the CPU 102 executes the OS program stored in the Rom 103. When the CPU 102 executes the OS program, various mobile phone functions, for example, an input/output function for receiving an instruction via the operation unit 106 and displaying an image on the display unit 107, a memory control function for accessing the storage unit 105 to write/read data, a program executing function for executing a program stored in the storage unit 105, a voice communication function, and a data communication function are implemented.

When the CPU 102 executes the OS program, a multitask function, which enables plural programs to be executed in parallel and a GUI (Graphical User Interface) function are implemented in the mobile phone 1. Furthermore, after executing the OS program, the CPU 102 executes the Java platform program. When the CPU 102 executes the Java platform program, a Java runtime environment 114 is implemented based on an OS 111, as shown in FIG. 5. Furthermore, a first storage 115 and a second storage are implemented in the non-volatile memory in the storage unit 105. The Java runtime environment 114 includes a class library 117, JVM (Java Virtual Machine) 118 and JAM (Java Application Manager) 119. The class library 117 includes a file into which plural program modules (classes) are combined. Each program module has a specific function. The JVM 118 has a function to interpret and execute a byte code. The JAM 119 has a function to manage download, installation, start and termination a Java application program.

The first storage 115 has a storage area in which a Java application program (a Jar file and an ADF) is stored. The Java application program is downloaded under the control of the JAM 119. The second storage 116 has a storage area in which data generated by the CPU 102 executing a Java application program is stored after execution of the Java application program is terminated. A unique storage area is allocated for each Java application program. Data stored in an area allocated for a Java application program can be rewritten while the Java application program is executed. Data of a particular Java application program cannot be rewritten by any other Java application program.

If a user inputs via the operation unit 106 an instruction to start a Java application program with the java runtime environment being implemented, the Java application program stored in the first storage 115 is interpreted and executed by the JVM 118. When the JVM 118 executes the Java application program, a window, which functions as a user interface between the application program and a user, is displayed on the display unit 107. In the mobile phone 1, an active window is switched in response to an instruction input by a user via the operation unit 106. Here, the "active window" refers to a window corresponding to an application receiving an input from a user. Furthermore, a position and size of a window can be changed in response to an instruction input by a user via the operation unit 106.

2. Operation

An operation for changing a size of a window will now be described in detail. If a user inputs via the operation unit 106 to the mobile phone 1 an instruction to start an application program, the CPU 102 executes the instructed application program. On executing the application program, the CPU 102 controls display unit 107 to display a window which functions as a user interface between a user and the application program.

Figure 7:
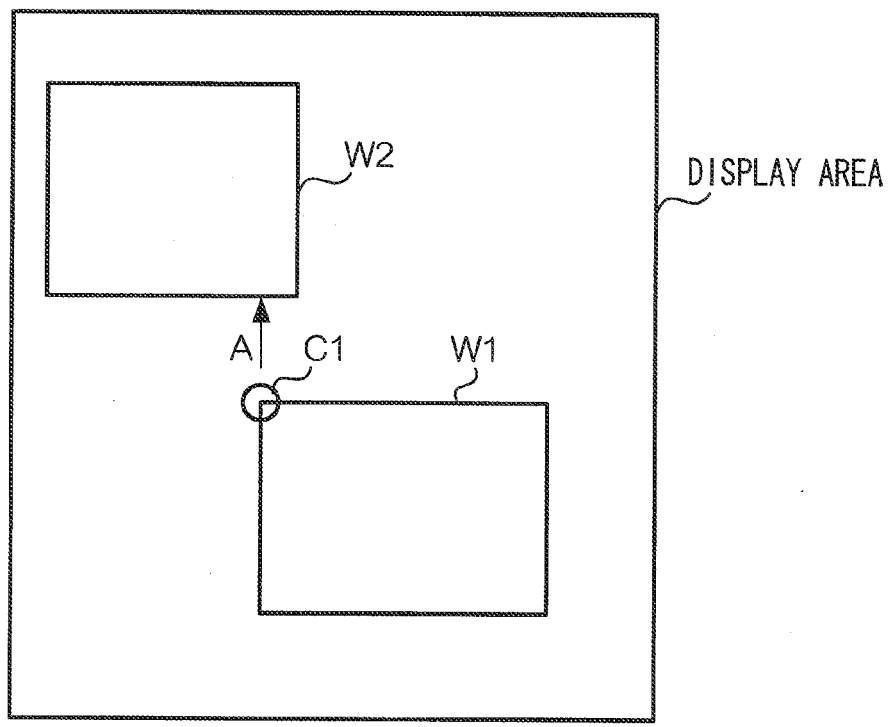
FIG. 7 shows an example of displayed windows.

When the CPU 102 displays a window, the CPU 102 generates a window identifier to identify the window. The CPU 102 records in the window table TB the generated identifier and coordinates of a vertex of the window. An example is shown in FIG. 7, in which two windows W1 and W2 are displayed on the display unit 107 corresponding to execution of two application programs. In this example, an identifier "001" is allocated to the window W1 and an identifier "002" is allocated to the window W2. The coordinates of a vertex of the window W1, top-left (X1,Y1), bottom-left (X1, Y2), top-right (X2, Y1) and bottom-right (X2, Y2) as shown in FIG. 4, are recorded in a field corresponding to the identifier "001" in the window table TB. The coordinates of a vertex of the window W2, top-left (X3,Y3), bottom-left (X3, Y4), top-right (X4, Y3) and bottom-right (X4, Y4) as shown in FIG. 4, are recorded in a field corresponding to the identifier "001" in the window table TB.

Figure 6:
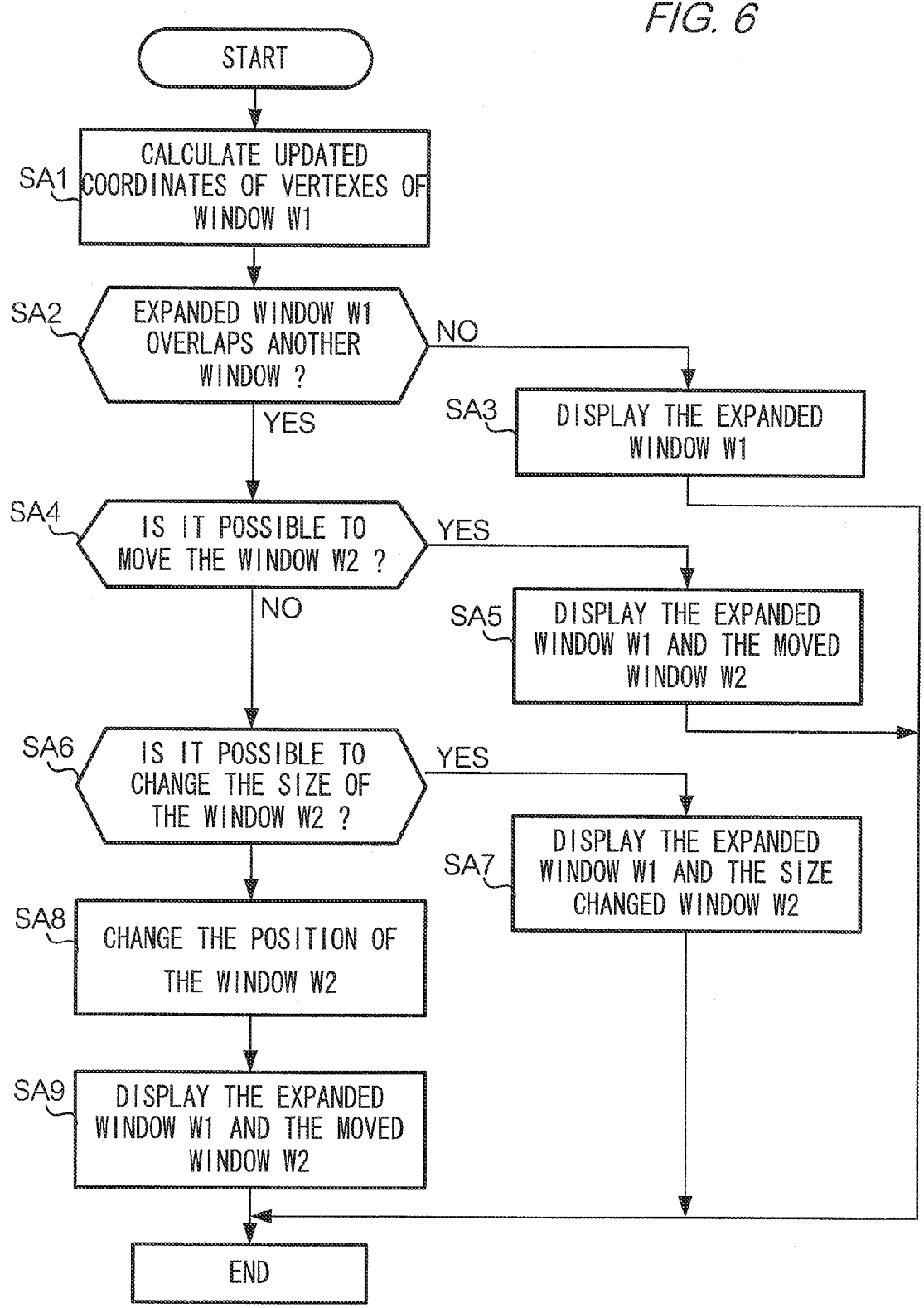
FIG. 6 shows an operation for changing a window size.

If a user wishes to expand the window W1, the user operates keys of the operation unit 106 to move a cursor on a vertex C1 of the window W1. When the user operates the keys of the operation unit 106 to drag with the cursor the vertex C1 towards a direction of an arrow A in FIG. 7, the CPU 102 performs an operation shown in FIG. 6.

The CPU 102 calculates (in step SA1) updated coordinates of vertexes of window W1, which is a window to be processed, based on original coordinates of the vertexes and a coordinate of the cursor. The CPU 102 determines (in step SA2) whether the expanded window W1 overlaps another window. An example is described in FIG. 8, in which the window W1 is expanded from its original size shown in FIG. 7. In this example, the CPU 102 determines whether at least one vertex of the expanded window W1 calculated in the step SA1 is within an area defined by a vertex of the window W2, based on the calculated coordinates of the vertexes. Alternatively, the CPU 102 determines whether at least one point on a vertical or horizontal line between two vertexes of the expanded window W1 calculated in the step SA1 is within the window W2, based on the calculated coordinates of the vertexes.

Figure 8:
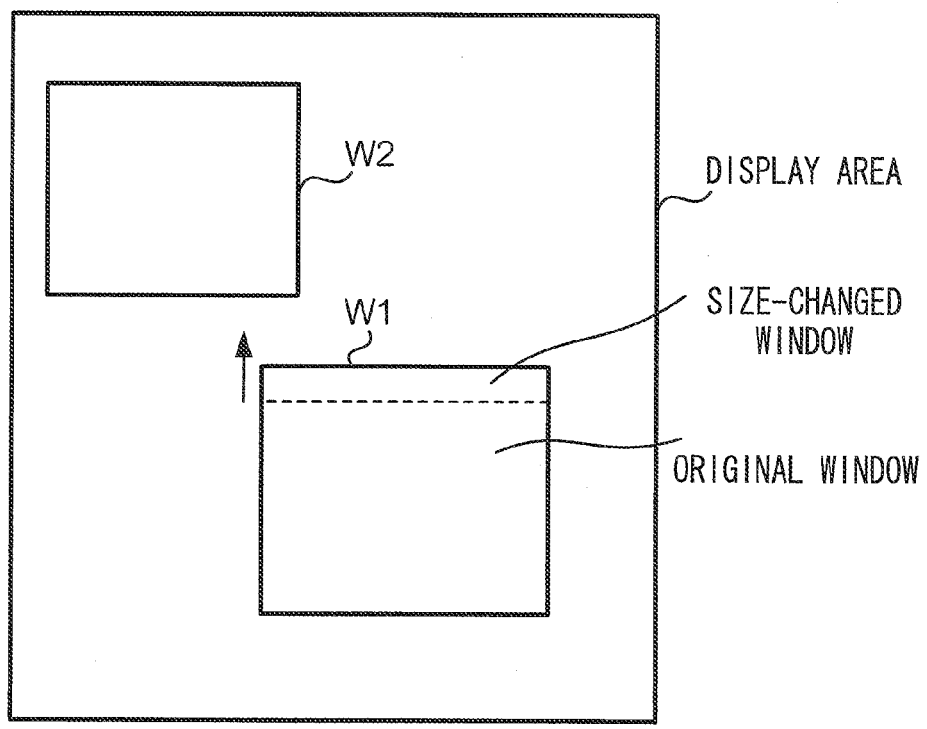
FIG. 8 shows an example of a position and size of windows.

If, as shown in FIG. 8, a vertex of the expanded window W1 is not within the window W2, the CPU 102 determines "NO" in the step SA2. If the CPU 102 determines "NO" in the step SA2, the CPU 110 controls (in step SA3) the display unit 107 to display the expanded window W1, coordinates of whose vertexes were calculated in the step SA1. The CPU 110 records in the window table TB the coordinates after the expansion.

Figure 9:
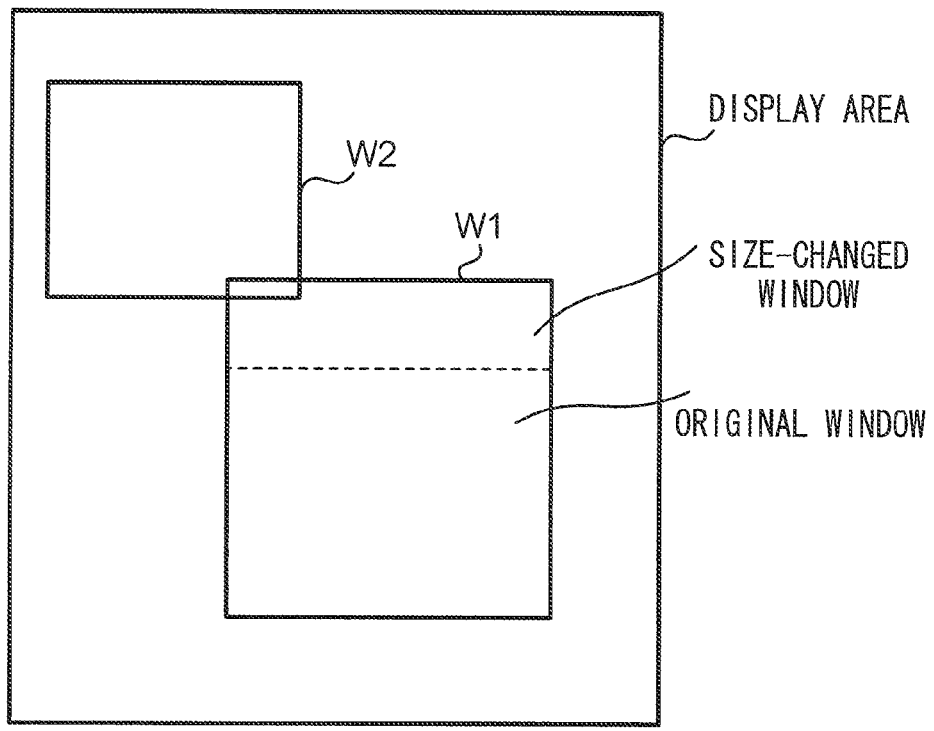
FIG. 9 shows an example of a position and size of windows.

If the user continues the operation to expand the window W1 by dragging with the cursor the vertex C1 towards the direction of arrow A, the CPU 102 repeats the above-described process. An example is shown in FIG. 9, in which one vertex of the window W1 is within the window W2; in other words, the window W1 overlaps the window W2.

If the CPU 102 determines that at least one vertex of the expanded window W1 calculated in the step SA1 is within the area defined by a vertex of the window W2 (step SA2: YES), the CPU 102 determines (in step SA4) whether it is possible to move the window W2, which is overlapping the window to be processed, within the display area.

Figure 10:
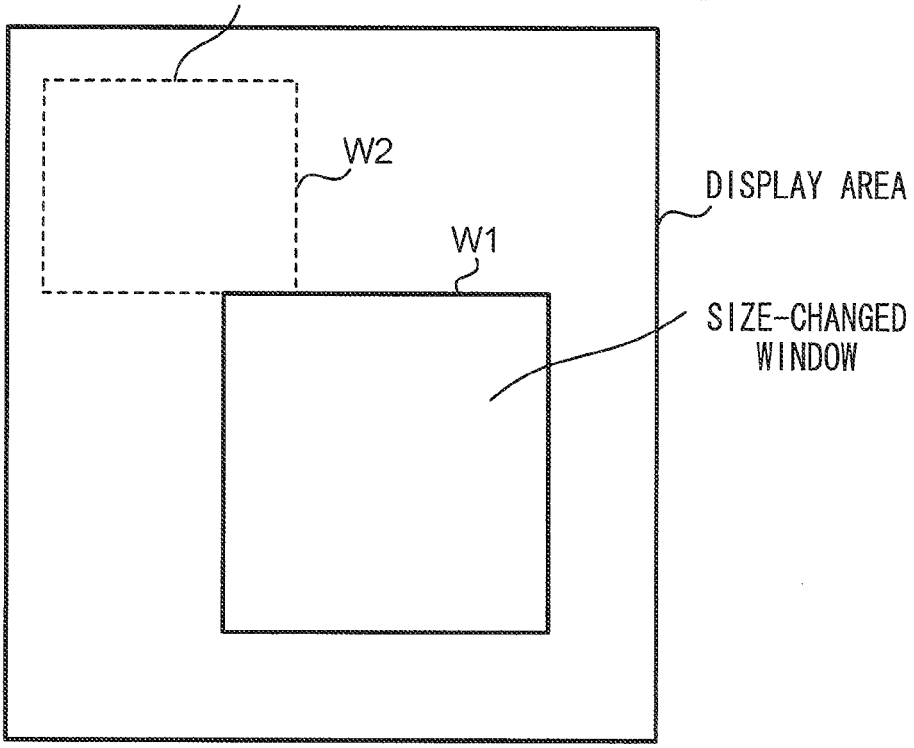
FIG. 10 shows an example of a position and size of windows.

In more detail, the CPU 102 calculates coordinates of window W2 after the move. The window W2 is moved towards the same direction as that of the expansion of the window W1, the direction of arrow A in this case, without changing the size of the window W2. The window W2 is moved a shortest distance such that the window W2 does not overlap the window W1. An example is shown in FIG. 10, in which all the vertexes of the moved window W2 are within the display area. In this example, the CPU 102 determines "YES" in the step SA4.

If the CPU 102 determines "YES" in the step SA4, the CPU 102 controls (in step SA5) the display unit 107 to display the expanded window W1 which has vertexes having coordinates calculated in the step SA1. Further, in the step SA5, the CPU 102 controls the display unit 107 to display the moved window W2 which is the same size as the original window W2. The CPU 110 records in the window table TB the coordinates of vertexes of the window W1 after the expansion and the coordinates of vertexes of the window W2 after the move.

Figure 11:
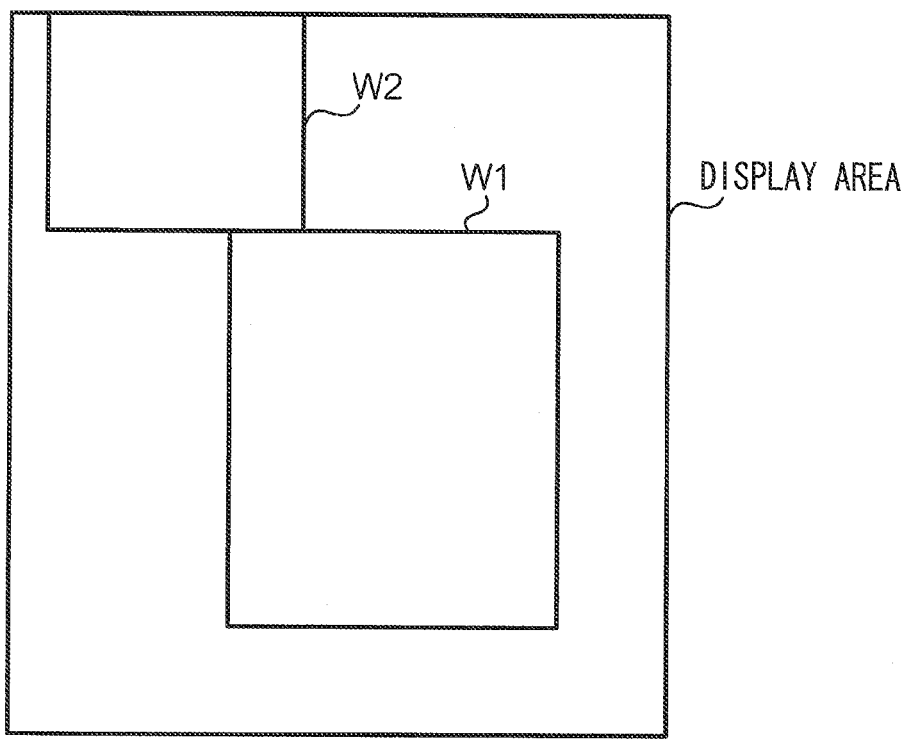
FIG. 11 shows an example of a position and size of windows.

If the user continues the operation to expand the window W1 by dragging the vertex C1 towards the direction of arrow A, the CPU 102 repeats the process in the steps SA1, SA2, SA4 and SA5. The window W2 moves towards the direction of arrow A as the window W1 is expanded. FIG. 11 shows an example in which the window W2 is moved to a position where one edge of the window W2 touches a border of the display area.

If the user continues the operation to expand the window W1 in the direction of arrow A, the CPU 102 calculates (in the step SA1) the coordinates of vertexes of the expanded window W1. The CPU 102 determines "YES" in the step SA2. The CPU 102 calculates coordinates of vertexes of the moved window W2. Since one edge of the window W2 before the move touches a border of the display window, the moved window W2 remains outside the display area, and the CPU determines "NO" in the step SA4.

Figure 12:
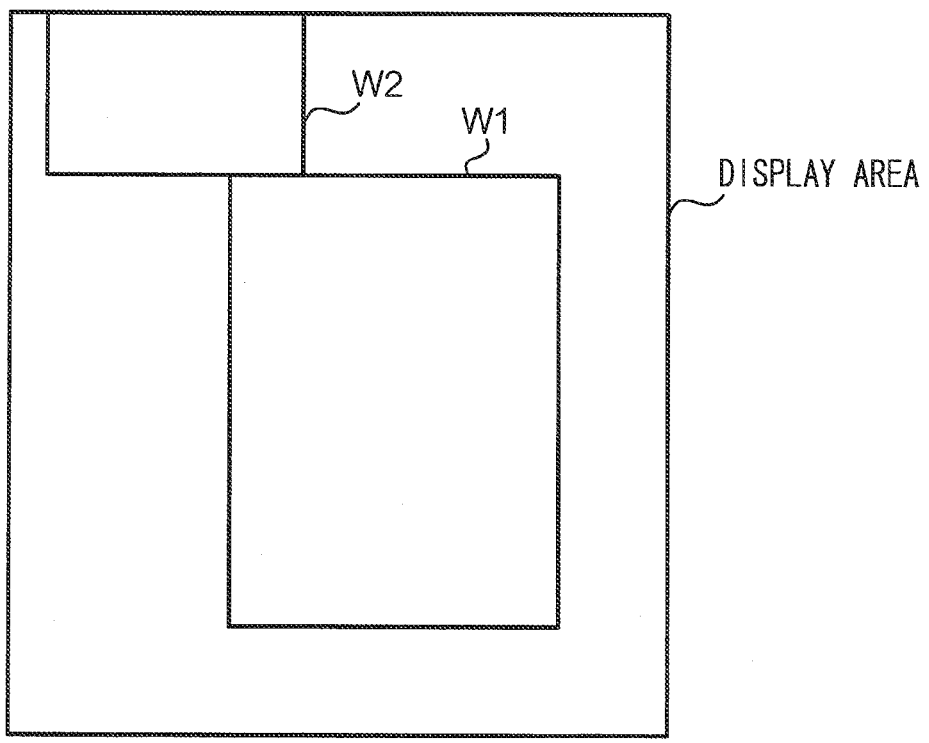
FIG. 12 shows an example of a position and size of windows.

If the CPU 102 determines "NO" in the step SA4, the CPU 102 determines (in step SA6) whether it is possible to change the size of the window W2. In more detail, the CPU 102 calculates coordinates of the vertexes of the window W2 after a change in its size. As shown in FIG. 12, the window W2 with a changed size touches the window W1 and touches the border of the display area. The CPU 102 next determines whether the size of the window W2 after the size change is less than a predetermined minimum size.

In the example shown in FIG. 12, if the window W1 is expanded in the direction of the arrow A, the CPU 102 calculates coordinates of the vertexes of the window W2 after the size of the window W2 decreases (in a y-axis direction in this example). The CPU 102 calculates a length of the window W2 along a y-axis, based on the calculated coordinates of the vertexes. If the calculated length is not less than a predetermined minimum size, the CPU 102 determines "YES" in the step SA6. If the CPU 102 determines "YES" in the step SA6, the CPU 102 controls (in step SA7) the display unit 107 to display the expanded window W1 and the window W2 after the size change. The CPU 110 records in the window table TB the coordinates of vertexes of the window W1 after the expansion and the coordinates of vertexes of the window W2 after the size-change.

If the user continues the operation to expand the window W1 by dragging the vertex C1 towards the direction of arrow A, the CPU 102 repeats the process in the steps SA1, SA2, SA4, SA6 and SA7. The window W2 shrinks (or reduces in size) in the direction of the arrow A as the window W1 is expanded towards the direction of the arrow A. If the user further continues the operation to expand the window W1, the length of the window W2 along a y-axis becomes the minimum length.

Figure 13:
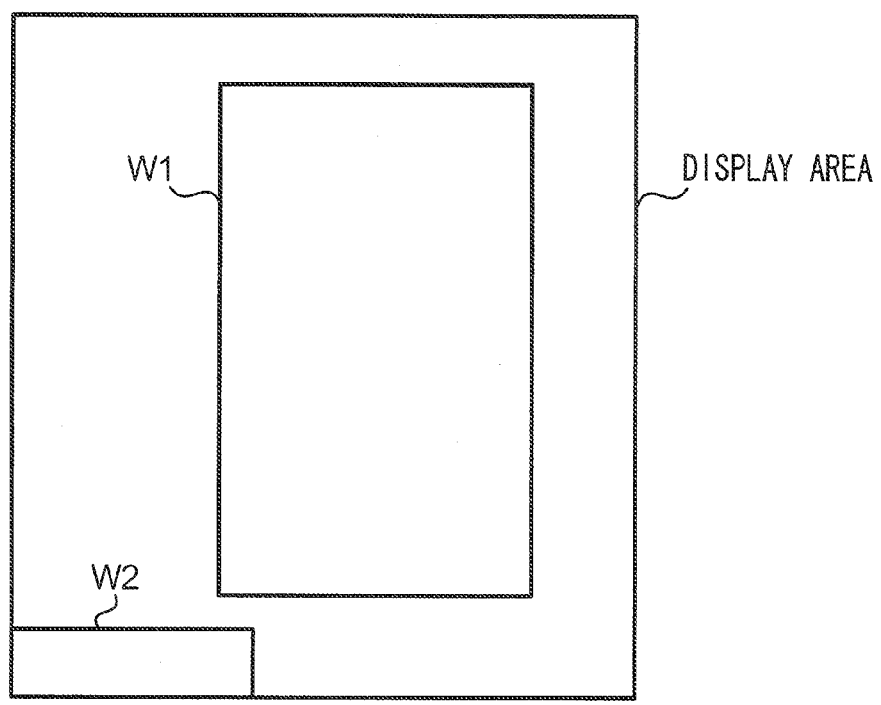
FIG. 13 shows an example of a position and size of windows.

If the user further continues the operation to expand the window W1 after the length of the window W2 along a y-axis becomes the minimum length, the CPU determines "NO" in the step SA6. If the CPU determines "NO" in the step SA6, the CPU 102 changes (in step SA8) the position of the window W2. For example, as shown in FIG. 13, the CPU 102 moves the window W2 to a position where the window W2 does not overlap the window W1. The CPU 102 calculates coordinates of the vertexes of the window W2. Then, the CPU 102 controls (in step SA9) the display unit 107 to display the expanded window W1 and the moved window W2.

Figure 14:
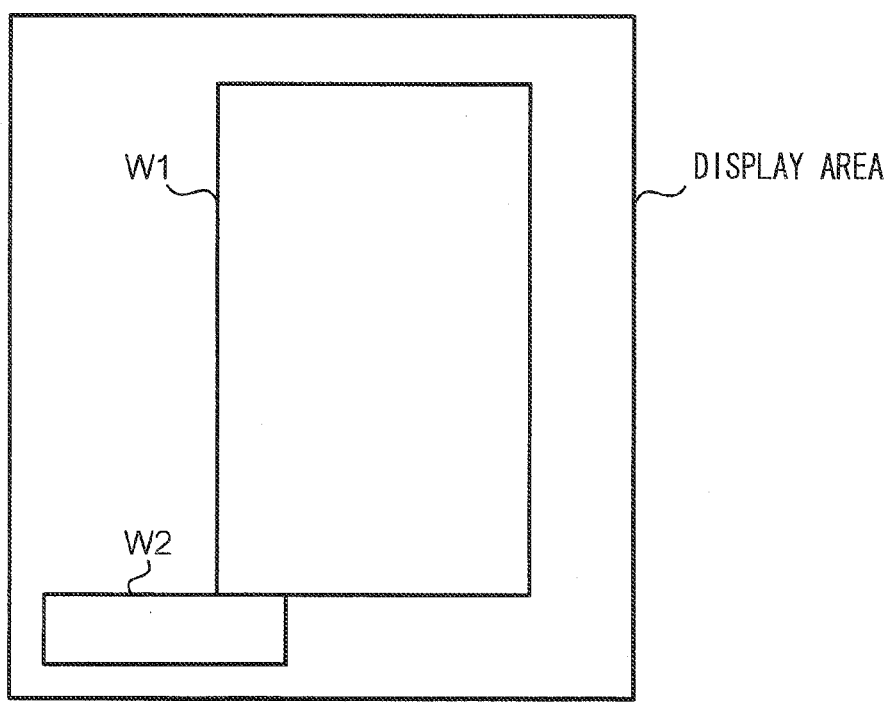
FIG. 14 shows an example of a position and size of windows.

It is to be noted that the window W2 may be moved toward any direction other than the direction of the arrow A, which is a direction toward which the window W1 is expanded. FIG. 13 merely shows an example. FIG. 14 shows another example, where the window W2 may be moved in a direction opposite to the direction in which the window W1 expands.

In another example, if the window W1 is located at a position that is above the window W2 before expansion, and the window W1 is expanded downward, the window W2 may be moved upward with the window W1 being expanded. In another example, if the window W1 is located further right than the window W2 before expansion and the window W1 is expanded leftward, the window W2 may be moved rightward with the window W1 being expanded. In another example, if the window W1 is located further left than the window W2 before expansion and the window W1 is expanded rightward, the window W2 may be moved leftward with the window W1 being expanded.

Next, an example shown in FIG. 13 will be described. If the user further continues the operation to expand the window W1 upward, the operation shown in FIG. 6 is performed again. In this case, since the window W1 does not overlap the window W2, the CPU 102 determines "NO" in the step SA2. The expanded window W1 is displayed on the display unit 107.

According to the embodiment described above, if the window W2, which is located in a direction toward which the window W1 is expanded, can no longer be moved, or the size can no longer be changed, the window W2 is moved in an opposite direction away from the window W1. Thus, the window W1 can be further extended when the vertex C1 is dragged.

Figure 15:
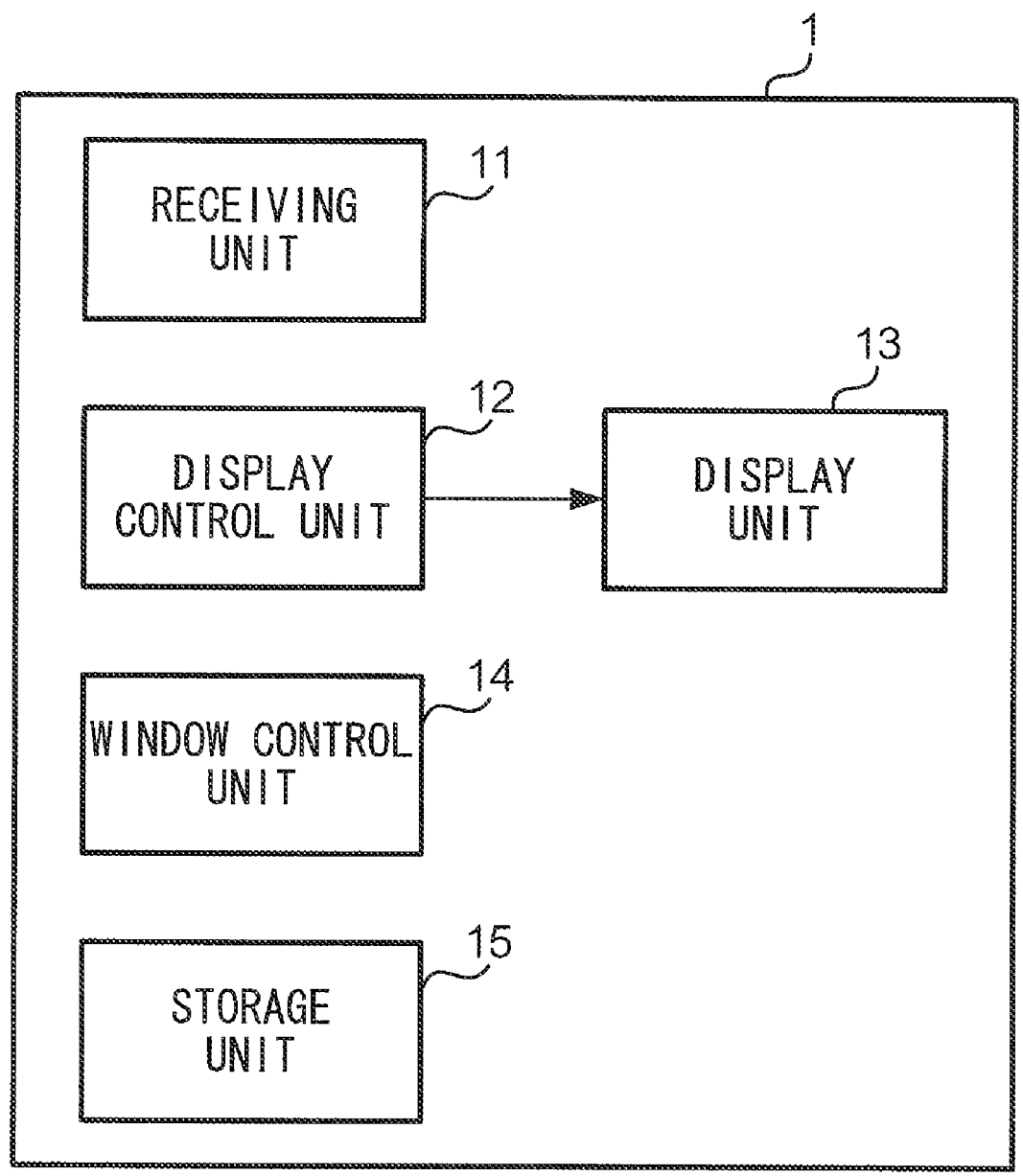
FIG. 15 is a block diagram illustrating a functional configuration of the mobile phone 1.

FIG. 15 is a block diagram illustrating a functional configuration of mobile phone 1. A receiving unit 11 receives an operation instruction input by a user. A display control unit 12 controls a display unit 13 to display a plurality of windows in a display area of the display unit 13. A window control unit 14 controls a size or a position of a window displayed on the display unit in response to the operation instruction received by the receiving unit 11. If the receiving unit 11 receives an operation instruction to expand a first window and the expanded first window overlaps a second window, the window control unit 14 controls a size or a position of the second window in response to a positional relationship between the first window and the second window. Details of the control are as follows. If (i) the overlapping is avoided by moving of the second window toward a direction to which the first window expands and (ii) the moved second window is displayed within the display area, the window control unit 14 moves the second window toward a direction to which the first window expands. If (i) the overlapping is avoided by moving of the second window toward a direction to which the first window expands and shrinking a size of the second window, (ii) the moved second window is displayed within the display area, and (iii) the shrunk second window is larger than a predetermined size, the window control unit moves the second window toward a direction to which the first window expands and shrinks the size of the second window. If (i) the overlapping is avoided by moving of the second window toward a direction to which the first window expands and shrinking a size of the second window, (ii) the moved second window is displayed within the display area, and (iii) the shrunk second window is smaller than a predetermined size, the window control unit moves the second window to a position where the second window does not overlap the expanded first window.

If (i) the overlapping is avoided by moving of the second window toward a direction to which the first window expands and shrinking a size of the second window, (ii) the moved second window is displayed within the display area, and (iii) the shrunk second window is smaller than the predetermined size, the window control unit 14 may move the second window to a predetermined position within the display area.

If (i) the overlapping is avoided by moving of the second window toward a direction to which the first window expands and shrinking a size of the second window, (ii) the moved second window is displayed within the display area, and (iii) the shrunk second window is smaller than a predetermined size, the window control unit 14 may move the second window toward a direction opposite to a direction to which the first window expands and shrink the second window.

In addition, the mobile phone includes a storage unit 15 that stores a size of a window for each window displayed on the display unit 13. The window control unit 14 controls the storage unit 15 to store a size of the second window. If (i) the overlapping is avoided by moving of the second window toward a direction to which the first window expands and shrinking a size of the second window, (ii) the moved second window is displayed within the display area, and (iii) the shrunk second window is smaller than the predetermined size, the window control unit 14 may move the second window to a position where the second window does not overlap the expanded first window and control a size of the second window so that it is the same as the size stored in the a storage unit 15.

In the embodiment described above, the operation unit 106 is an example of the receiving unit 11. The CPU 102 is an example of the display control unit 12 and the window control unit 14. The display unit 107 is an example of the display unit 13. The ROM 103, the RAM 104, the storage unit 105 are examples of the storage unit 15. A relationship between the functional elements and the hardware elements is not restricted to that described in the embodiment. For example, another processor may have a function corresponding to the display control unit 12 or the window control unit 14.

3. Further Embodiments

The invention is not limited to the embodiments described above, and various modifications may be applied. Some modifications are described below. At least two modifications may be combined.

The information processing device is not limited to a mobile phone. The information processing device may be a personal computer, a PDA (Personal Digital Assistant), or another computer device as long as the device has a function of executing plural programs in parallel and a function of displaying plural windows for the plural programs.

When the expanding window W1 touches the window W2, the CPU 102 may store in the storage unit 105 the size of the window W2. In this case, when the CPU 102 moves the window W2 in the step SA8, the CPU 102 reads the size of the window W2 from the storage unit 105. In the step SA9, the size of the window W2 may be changed so as to be equal to the size read from the storage unit 105.

The program implementing a function to change location or size of a window may be distributed in a computer-readable storage medium such as a CD-ROM (Compact Disk Read Only Memory). In this case, mobile phone 1 is connected to a computer device having a drive to read data from the CD-ROM. The program may be installed in the storage unit 105 via the computer device. The computer-readable storage medium may be a flexible disk, a DVD (Digital Versatile Disk), or an IC card having a flash ROM. Alternatively, the program may be downloaded via a communication network.

What is claimed is:

1. An information processing device, comprising:
   a display control unit configured to control a display unit to display at least a first window and a second window in a display area of the display unit;
   a receiving unit configured to receive an input by a user, the input comprising instructions to expand the first window in the display area;
   a window control unit configured to control a size or position of the first window and the second window in response to the instructions, wherein the window control unit is configured to effectuate at least four sequential controls comprising:
   a first of the at least four sequential controls comprising expanding the first window;
   a second of the at least four sequential controls comprising continuing the expanding of the first window and moving the second window toward a direction in which the first window expands, the second of the at least four sequential controls being executable if overlapping of the first window and second window is avoided by the moving of the second window toward the direction in which the first window expands and the moved second window is displayed within the display area,
   a third of the at least four sequential controls comprising continuing the expanding of the first window and shrinking the second window, the third of the at least four sequential controls being executable if the second window cannot be further moved toward the direction in which the first window expands, the moved second window is displayed within the display area, and the shrunk second window is larger than a predetermined size, and
   a fourth of the at least four sequential controls comprising continuing the expanding of the first window and moving the second window in another direction to a position at which the first and second windows do not overlap, the fourth of the at least four sequential controls being executable if the moved second window is displayed within the display area, and the second window cannot be shrunk smaller than the predetermined size.

2. The information processing device according to claim 1, wherein
   the second of the at least four sequential controls comprises moving the second window to a predetermined position within the display area.

3. The information processing device according to claim 1, wherein
   the second of the at least four sequential controls comprises moving the second window toward an opposite direction to that in which the first window expands and shrinking the second window.

4. The information processing device according to claim 1, further comprising
   a storage unit configured to store a size of each of the at least the first window and the second window displayed on the display unit, wherein
   the window control unit is configured to control the a storage unit to store a size of the second window,
   if the overlapping is avoided by moving of the second window toward a direction in which the first window expands and shrinking the size of the second window, the moved second window is displayed within the display area, and the shrunk second window is smaller than a predetermined size, the window control unit is configured to move the second window to a position where the second window does not overlap the expanded first window and controls a size of the second window so as to be the same as the size stored in the a storage unit.

5. A method for controlling windows displayed on a device, the method comprising:
   displaying at least a first window and a second window in a display area of the device;
   receiving an input by a user, the input comprising instructions to expand the first window in the display area;
   controlling a size or position of the first window and the second window in response to the instructions, wherein the controlling comprises effectuating at least four sequential controls comprising:
   a first of the at least four sequential controls expanding the first window;
   a second of the at least four sequential controls continuing the expanding of the first window and moving the second window toward a direction in which the first window expands, the second of the at least four sequential controls being executable if overlapping of the first window and second window is avoided by the moving of the second window toward the direction in which the first window expands and the moved second window is displayed within the display area,
   a third of the at least four sequential controls continuing the expanding of the first window and shrinking the second window, the third of the at least four sequential controls being executable if the second window cannot be further moved toward the direction in which the first window expands, the moved second window is displayed within the display area, and the shrunk second window is larger than a predetermined size, and a fourth of the at least four sequential controls continuing the expanding of the first window and moving the second window in another direction to a position at which the first and second windows do not overlap, the fourth of the at least four sequential controls being executable if the moved second window is displayed within the display area, and the second window cannot be shrunk smaller than the predetermined size.

* * * * *